United States Patent
Campagna

(10) Patent No.: US 12,541,759 B1
(45) Date of Patent: Feb. 3, 2026

(54) DERIVED IMPLICIT CERTIFICATE

(71) Applicant: Amazon Technologies, Inc., Seattle, WA (US)

(72) Inventor: Matthew John Campagna, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 2014 days.

(21) Appl. No.: 15/872,884

(22) Filed: Jan. 16, 2018

(51) Int. Cl.
| | |
|---|---|
| *G06Q 20/38* | (2012.01) |
| *G06Q 20/06* | (2012.01) |
| *H04L 9/00* | (2022.01) |
| *H04L 9/06* | (2006.01) |
| *H04L 9/14* | (2006.01) |

(Continued)

(52) U.S. Cl.
CPC ....... *G06Q 20/3829* (2013.01); *G06Q 20/065* (2013.01); *H04L 9/0637* (2013.01); *H04L 9/14* (2013.01); *H04L 9/30* (2013.01); *H04L 9/3247* (2013.01); *H04L 9/3263* (2013.01); *G06Q 2220/00* (2013.01); *H04L 9/50* (2022.05); *H04L 2209/56* (2013.01)

(58) Field of Classification Search
CPC ............ G06Q 20/065; G06Q 20/3829; G06Q 2220/00
See application file for complete search history.

(56) References Cited

U.S. PATENT DOCUMENTS

| | | | | |
|---|---|---|---|---|
| 2009/0323953 | A1* | 12/2009 | Narayan | G06Q 40/00 380/258 |
| 2012/0246466 | A1* | 9/2012 | Salvarani | H04L 9/007 713/156 |

(Continued)

FOREIGN PATENT DOCUMENTS

CN      1437375 A   *   8/2003

OTHER PUBLICATIONS

Campagna, M., "Sec 4: Elliptic Curve Qu-Vanstone Implicit Certificate Scheme (ECQV)," Standards for Efficient Cryptography, Certicom Research, Jan. 24, 2013, Version1.0, 32 pages.

(Continued)

*Primary Examiner* — Neha Patel
*Assistant Examiner* — Nicholas K Phan
(74) *Attorney, Agent, or Firm* — Davis Wright Tremaine LLP

(57) ABSTRACT

A client computer system implements a cryptocurrency wallet using derived cryptographic keys generated from an implicit certificate. The client computer system uses a root key pair that includes a root public key and a root private key to produce the implicit certificate. The implicit certificate is provided to other entities which generate derived public keys from the implicit certificate. In an embodiment, the client computer system encodes an identifier and additional information into the implicit certificate. In an embodiment, entities may derive one or more public keys from the implicit certificate, and the client computer system may derive corresponding private keys from the implicit certifi- (Continued)

cate and the root key pair. In an embodiment, the client computer system generates a tree or derived key pairs that may be used to delegate portions of the cryptocurrency wallet to other computer systems.

15 Claims, 11 Drawing Sheets

(51) Int. Cl.
*H04L 9/30* (2006.01)
*H04L 9/32* (2006.01)

(56) References Cited

U.S. PATENT DOCUMENTS

| | | | | |
|---|---|---|---|---|
| 2012/0284508 A1* | 11/2012 | Zaverucha | ............ | H04L 9/3263 |
| | | | | 713/156 |
| 2013/0046972 A1* | 2/2013 | Campagna | ............ | H04L 9/3263 |
| | | | | 713/156 |
| 2014/0075185 A1* | 3/2014 | Dragomir | ............ | H04L 9/3268 |
| | | | | 713/156 |
| 2014/0211938 A1* | 7/2014 | Campagna | ............ | H04L 9/3252 |
| | | | | 380/44 |
| 2014/0213217 A1* | 7/2014 | Ho | ............ | H04L 63/105 |
| | | | | 455/411 |
| 2016/0261409 A1* | 9/2016 | French | ............ | H04L 9/3234 |
| 2017/0228731 A1* | 8/2017 | Sheng | ............ | G06Q 20/401 |
| 2017/0230189 A1* | 8/2017 | Toll | ............ | H04L 9/3247 |
| 2018/0131511 A1* | 5/2018 | Taylor | ............ | H04L 9/14 |
| 2019/0207760 A1* | 7/2019 | Hennebert | ............ | G06Q 20/3672 |

OTHER PUBLICATIONS

Dang, Q., "Recommendation for Applications Using Approved Hash Algorithms," National Institute of Standards and Technology (NIST) Special Publication 800-107, Revision 1, Aug. 2012, 25 pages.

Gutoski, G. and D. Stebila, "Hierarchical Deterministic Bitcoin Wallets That Tolerate Key Leakage," In 19th International Conference on Financial Cryptography and Data Security, Jan. 26-30, 2015, San Juan, Puerto Rico, Lecture Notes in Computer Science 8975:497-504.

"Implicit Certificate," Wikipedia, The Free Encyclopedia, Jul. 5, 2017, <https://en.wikipedia.org/wiki/Implicit_certificate> [retrieved Jan. 16, 2018], 7 pages.

"SEC 1: Elliptic Curve Cryptography," Standards for Efficient Cryptography, Certicom Research, Sep. 20, 2000, Version 1.0, 96 pages.

Wuille, P., "Hierarchical Deterministic Wallets," Github.com, Feb. 11, 2012, <https://github.com/bitcoin/bips/blob/ master/bip-0032.mediawiki> [retrieved Jan. 16, 2018], 10 pages.

* cited by examiner

DERIVED IMPLICIT CERTIFICATE

BACKGROUND

A cryptocurrency wallet is an application that manages cryptocurrency balances and provides payment addresses for receiving payments from others. Cryptocurrency wallets, such as Bitcoin clients determine balances by tracking the collection of unspent transaction outputs controlled by the user. If a payment is to be received by the user, the wallet application provides a payment address in the form of a public cryptographic key (or cryptographic hash) to which the payment can be made. In some embodiments, the payment address is a public key that is associated with a private key known to the user. In some embodiments, a master key known to the user is used to generate a plurality of different key pairs. In this way, different keys can be provided to different payers or even for different transactions to the same payer. Such key derivation schemes are an important aspect of cryptocurrency wallets, because they provide increased privacy and security to the wallet's user.

BRIEF DESCRIPTION OF THE DRAWINGS

Various techniques will be described with reference to the drawings, in which.

DETAILED DESCRIPTION

Figure 1:
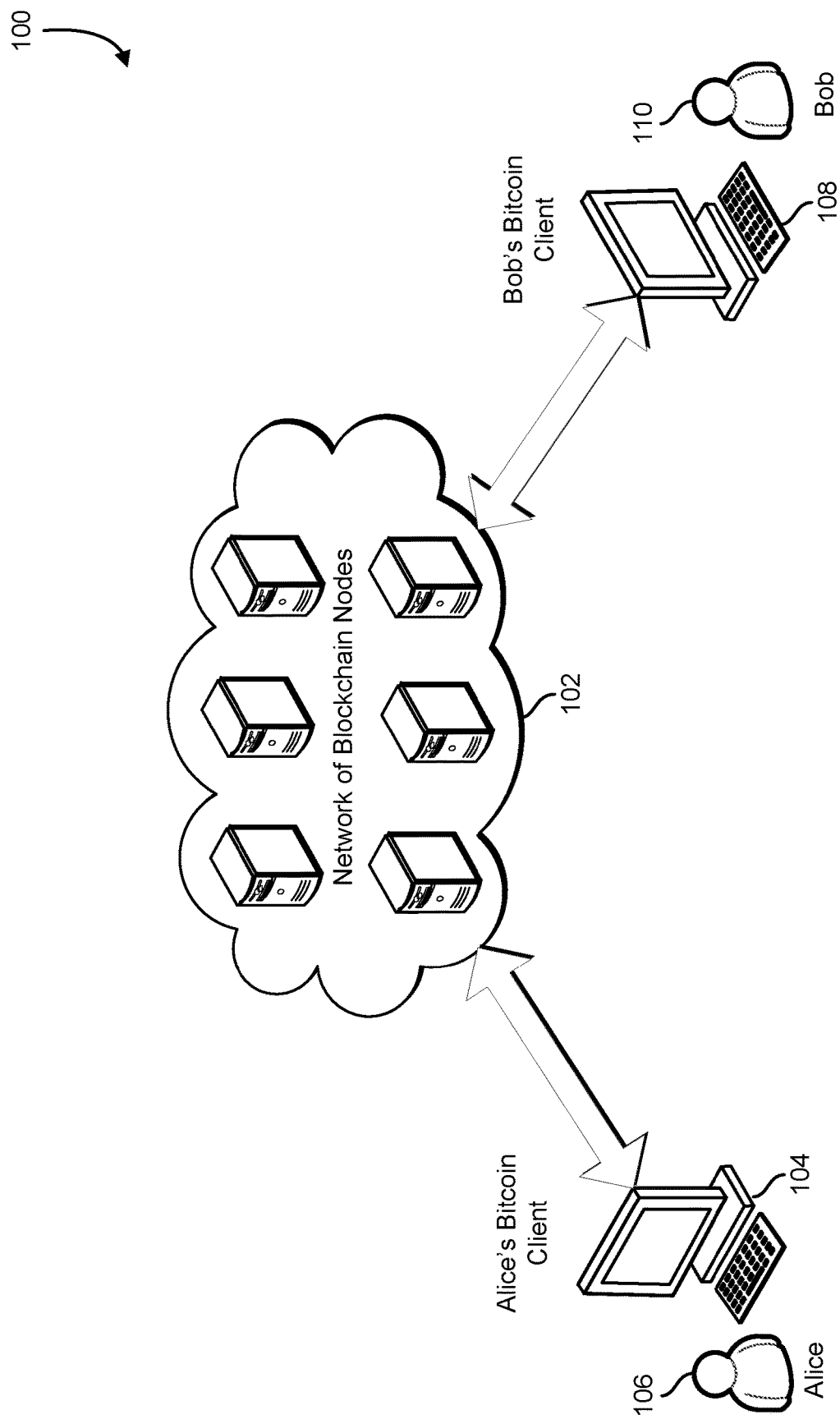
FIG. 1 illustrates a system that performs blockchain transactions using a network of blockchain nodes in accordance with one embodiment.

The present document describes a system and method that provides derived cryptographic keys suitable for use in a cryptocurrency wallet, among other applications, such as applications involving blockchain transactions that do not necessarily involve cryptocurrency. In an embodiment, access to a cryptocurrency wallet, such as a Bitcoin wallet, is controlled by a client computer system using a root key pair. In an embodiment, the root key pair includes a root public key and a root private key. In an embodiment, the client computer system implements a cryptocurrency wallet and is able to receive cryptocurrency (i.e., enable transactions to transfer cryptocurrency) by providing a public key to which funds may be sent, and send the received funds to another entity by providing a signature created with a corresponding private key. In an embodiment, the client computer system derives a plurality of key pairs from the root public key and the root private key, and transactions are performed using the derived keys. In an embodiment, the client computer system provides access to public keys of the wallet by way of an implicit certificate. In an embodiment, the client computer system creates an implicit certificate from the root key pair, an identifier, and optional additional information. In an embodiment, the implicit certificate is provided to another entity, and the implicit certificate is used by the other entity to derive a public key which is used to make a payment to the cryptocurrency wallet. In an embodiment, a derived private key corresponding to the derived public key is generated by the client computer system using the root key pair, and the derived private key may be used to spend the received funds.

In an embodiment, the client computer system derives a plurality of digital certificates from the root key pair using different identifiers, and the plurality of digital certificates are distributed to a plurality of other entities to receive individual payments. In an embodiment, use of an implicit certificate as a payment address provides additional protection for a cryptocurrency wallet since other entities cannot use an implicit certificate by itself to derive the root additional public or private keys.

In an embodiment, the system produces derived keys suitable for use in a blockchain transaction. In an embodiment, the system uses notions of implicit certificates to derive keys. In an embodiment, a root key pair is used ($d_R$, $Q_R$), where $d_R$ is a private key and $Q_R$ is a corresponding public key. In an embodiment, a derived key is generated from the root key pair as follows. In an embodiment, we start with a random identifier i and compute a first private key $d=d_R+\text{hash}(i,Q_R)$. In an embodiment, the value $r=\text{hash}(i\|d)$ is determined. In an embodiment, the value $P=dG+rG$ is computed as the implicit point included in the certificate, where G is the base point generator parameter for an elliptic curve domain. In an embodiment, the certificate is formed as (i, P). In an embodiment, elliptic curve Qu-Vanstone ("ECQV") methods are applied to generate the implicit certificate. In an embodiment, ECQV methods are applied to recover the public key defined by the certificate (i, P). In an embodiment, the public key $Q_i$ is recovered from the certificate (i,P) by determining hash (i, P)P+$Q_R$ where $Q_R$ is the root public key.

In an embodiment, the possessor of the root private key $d_R$ can compute the associated private key $d_i$ by determining hash $(i,P)(d_R+\text{hash}(i,Q_R)+\text{hash}(i, \text{hash}(i, Q_R))+d_R$ (modulo n), where addition and multiplication is done modulo n, which is the order of the elliptic curve group.

In an embodiment, additional information is encoded into the implicit certificate. In an embodiment, the additional information is a policy that describes a restriction or qualification on the use of the public key derived from the implicit certificate. In an embodiment, the policy describes validity periods for the use of the derived key, or expense limits for the derived key. In an embodiment, the policy may define that the certificate is valid for a particular time period, that funds associated with the certificate must be spent by a particular date, or that the transactions made with the certificate must not exceed a particular amount, such as $10,000.00, 500 BTC, or other threshold.

In an embodiment, the owner of the root key pair may combine the derivation of the implicit certificate and the associated private key into a single routine. In an embodiment, by combining the derivation of the implicit certificate and the associated private key, the total number of calculations for the combined operations is reduced.

In an embodiment, the key derivation scheme can be used to derive trees of derived keys and associated digital certificates, which are defined by a path of identifiers. In an embodiment, the client computer system provides a subordinate computer system with a derived private key and an associated implicit certificate ($d_i$, $cert_i$). The subordinate computer system uses the derived key and associated implicit certificate ($d_i$, $cert_i$) as a new root key pair, and derives additional subordinate certificates ($d_{i,j}$, $cert_{i,j}$) and key pairs using a process analogous to the process defined above, and described in more detail below.

In various embodiments, the present method and system expands upon the information that can be associated with a derived key used in a cryptocurrency transaction. In an embodiment, it removes a potential attack vector where learning a single derived key may reveal the master key.

FIG. 1 shows a system in accordance with one embodiment. A diagram illustrates an embodiment of a system 100 that performs Bitcoin transactions using a network of blockchain nodes 102. In an embodiment, a first client computer system 104 is operated by a user named Alice, and a second client computer system 108 is operated by a user named Bob 110. In an embodiment, each client computer system may be a cell phone, a wearable device, a smart watch, a tablet computer system, a laptop computer, a desktop computer system, or other computing device. In an embodiment, each client computer system includes one or more processors and memory storing instructions that implement a client application. In an embodiment, the client application is a cryptocurrency application such as a cryptocurrency client or a cryptocurrency wallet application. In an embodiment, the cryptocurrency is Bitcoin, Bitcoin Cash, Litecoin, Etherium, ZCash, Dash, Ripple, or Monero, although other cryptocurrencies are considered as being within the scope of the present disclosure. Embodiments of the methods disclosed herein may be applicable to other systems that use cryptographically derived destination addresses for transactions, such as transactional blockchain applications.

In an embodiment, a Blockchain applications use a key-derivation scheme where an elliptic curve root key pair is created ($d_R$;$Q_R$), where $d_R$ is the private key, and $Q_R$ is the public key. In an embodiment, derived keys are generated by using a random identifier i. and the random identifier may be of various sizes, such as 256-bits. In an embodiment, the derived key may be determined by computing $di=d_R+hash(i;Q_R)$, where $hash(*;*)$ is a cryptographically strong hash or one-way function that takes two inputs and outputs a hash value, where the hash value is interpreted as an integer. Consequently, as a property of the elliptic curve group, the public key may, in an embodiment, be computed independently of the private key $Q_i=Q_R+hash(i;Q_R)G$, where G is the base point on the elliptic curve. In an embodiment, only the root private key can generate derived private keys, since they must keep dR private. In an embodiment, others who have access to the public key can generate the derived public key $Q_i$, using i and $Q_R$, neither of which are secrets. In an embodiment, additional derivations can occur using ($d_i$; $Q_i$) as a root key, and in this way a tree of keys can be derived to complement a flat derivation of derived keys.

In an embodiment, a cryptocurrency wallet application is used to manage cryptocurrency funds using a root key pair (root public key and root private key) associated with the owner of the wallet. In an embodiment, the wallet application derives a plurality of public-private key pairs, and each key pair is used for a cryptocurrency transaction. In an embodiment, funds are sent to the wallet by making one of the derived public keys available to the payer, and funds are sent by submitting a transaction that is signed with one of the derived private keys.

In an embodiment, the network of blockchain nodes 102 is comprised of a plurality of computer systems, each of which hosts a service that maintains a copy of a ledger that records a transaction history. In an embodiment, the ledger is secured cryptographically by hashes that are verified collectively by the network of blockchain nodes 102. In an embodiment, each node in the network of blockchain nodes 102 is a Bitcoin node.

In an embodiment, Alice 106 wishes to send payment to Bob 110. In an embodiment, the second client computer system 108 operated by Bob 110 derives an implicit certificate from Bob's root key pair and a derivation identifier. In an embodiment, the second client computer system 108 sends the implicit certificate to the first client computer system 104. In an embodiment, the first client computer system 104 operated by Alice 106 receives the implicit certificate and derives a public key that corresponds to the implicit certificate. In an embodiment, Alice 106 uses the first client computer system 104 to generate a cryptocurrency transaction using the derived public key as the destination for the funds, and other derived private keys from Alice's wallet (which are associated with an appropriate amount of cryptocurrency) are used to sign the transaction. In an embodiment, the cryptocurrency transaction is submitted to the network of blockchain nodes 102, and the transaction is hashed and confirmed by the network.

In an embodiment, when Alice 106 receives payment from Bob 110, the first client computer system 104 generates an implicit certificate based on Alice's root key pair, and provides the implicit certificate to the second client computer system 108 operated by Bob 110. In an embodiment, the second client computer system 108 generates a derived public key from the implicit certificate provided by Alice. In an embodiment, Bob 110 uses the second client computer system 108 to generate a cryptocurrency transaction using the derived public key as the destination for payment. The second client computer system 108 submits the transaction to the network of blockchain nodes 102, and the transaction is hashed and confirmed by the network.

In an embodiment, sending cryptocurrency from one party to another is accomplished by adding a transaction to a ledger maintained by the blockchain. In an embodiment, the sender of the funds provides evidence, such as a digital signature, that proves that the sender has control over unspent output transactions. In an embodiment, using payment information (such as a public key provided by the recipient), the sender cryptographically locks the output of the transaction to the recipient. In an embodiment, the output of the transaction is locked by specifying the public key, or a cryptographic hash of the public key provided by the recipient.

Figure 2:
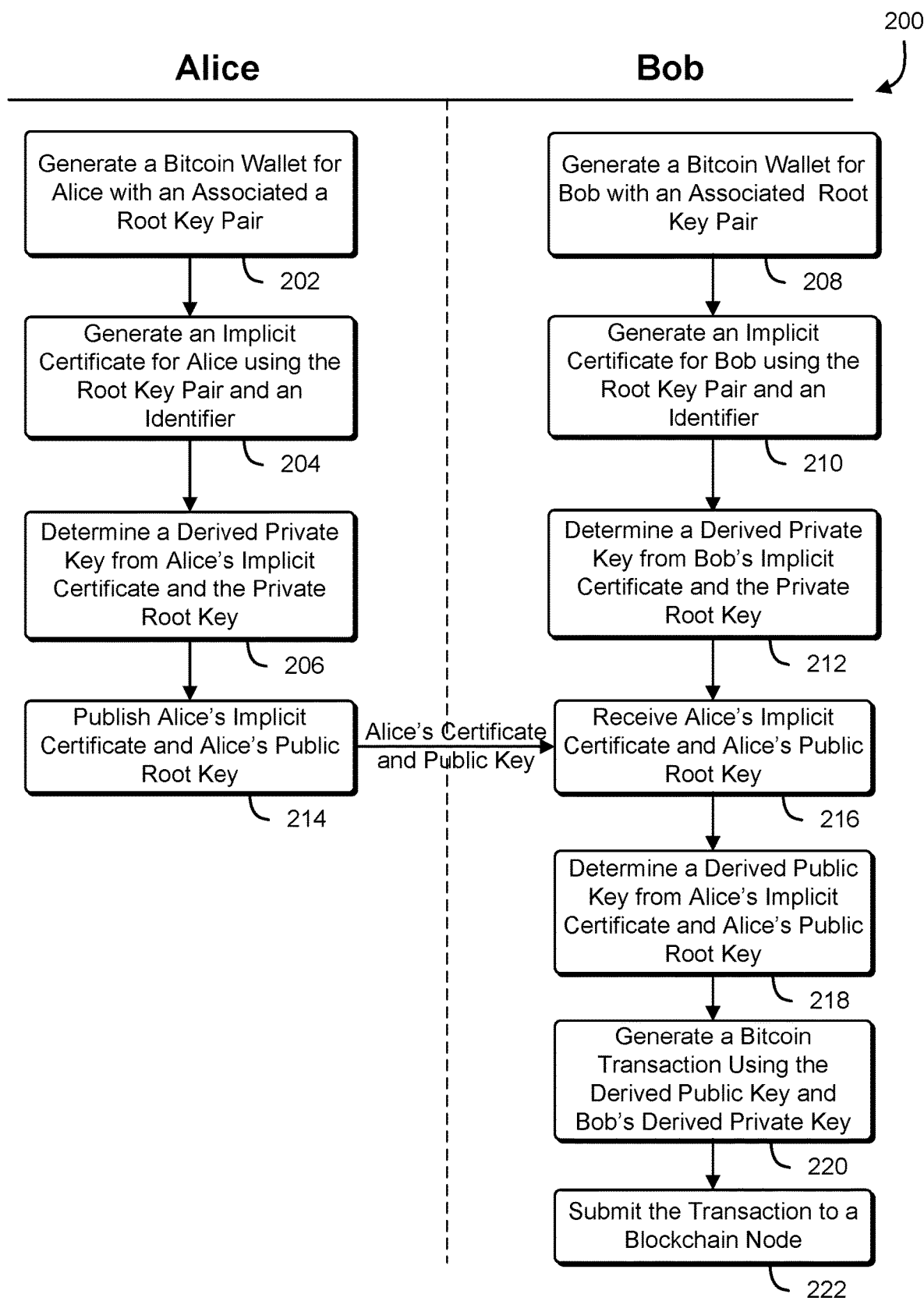
FIG. 2 shows a process to perform a blockchain transaction using implicit certificates in accordance with one embodiment.

FIG. 2 shows an illustrative example of a process, in accordance with one embodiment. In an embodiment, a flowchart illustrates a process 200 that, as a result of being performed by Bitcoin clients operated by Alice and Bob, performs a Bitcoin transaction using implicit certificates. In the present document, the term client may be used to describe a client computer system, and the term client computer system may be used to describe a wide range of computing devices such as personal computers, cell phones, tablet computers, notebook computers, and wearable devices. In an embodiment, the process begins at block 202 where Alice's client generates a Bitcoin wallet with an associated root key pair. In an embodiment, Alice's client generates the Bitcoin wallet by generating a random root key pair made up of a public key and the corresponding private key. In an embodiment, at block 204, Alice's client generates an implicit certificate for Alice using the root key pair. In an embodiment, the implicit certificate is based at least in part on an identifier associated with the particular implicit certificate being generated. In an embodiment, the root implicit certificate for Alice is generated with an identifier of zero. In an embodiment, optional information may also be encoded into the implicit certificate. In an embodiment, when the implicit certificate is provided to another entity, the other entity may use the implicit certificate to recover the optional information, and the optional information may be cryptographically verified. In an embodiment, at block 206, Alice's client derives a private key for the implicit certificate using the implicit certificate and Alice's private root key.

In an embodiment, Bob's client performs a number of preliminary operations beginning at block 208. In an embodiment, at block 208, Bob's client generates a Bitcoin wallet with an associated root key pair. In an embodiment, Bob's root key pair includes a root public key and a corresponding root private key. In an embodiment, at block 210, Bob's client generates an implicit certificate for Bob using Bob's root key pair. In an embodiment, the implicit certificate is based at least in part on an identifier associated with the particular implicit certificate. In an embodiment, the root implicit certificate is based at least in part on a derivation identifier of zero. In an embodiment, additional implicit certificates may be generated with a sequence of identifiers or random identifiers. In an embodiment, Bob and Alice's clients generate a deterministic sequence of identifiers with which derived implicit certificates are generated. In an embodiment, when the implicit certificate is provided to another entity, the other entity may use the implicit certificate to recover the optional information, and the optional information may be cryptographically verified. In an embodiment, at block 212, Bob's client derives a private key for the implicit certificate using the implicit certificate and Bob's private root key.

In an embodiment, after Bob's client and Alice's client have performed the above operations, both Alice and Bob are in possession of a corresponding implicit certificate and a corresponding private key. In an embodiment, cryptocurrency transactions may be made by one party providing an implicit certificate to the other party, and the other party generating a payment transaction to a public key derived from the provided implicit certificate. In an embodiment, either party may generate new implicit certificates which are derived from the root key pair and an identifier which is sometimes called a derivation identifier.

In an embodiment, Bob wishes to make a payment to Alice. In an embodiment, at block 214, Alice publishes Alice's implicit certificate and Alice's public root key. In an embodiment, Alice sends Alice's implicit certificate and Alice's public root key to Bob's client over a computer network as part of the request for payment.

In an embodiment, at block 216, Bob's client receives the request for payment along with Alice's certificate and Alice's root public key. In an embodiment, at block 218, Bob's client uses Alice's root public key and Alice's certificate to extract a corresponding public key. In an embodiment, Bob's client may also extract a derivation identifier and/or additional information from Alice's implicit certificate. In an embodiment, the additional information may include policies or restrictions on the use of the implicit certificate. In an embodiment, the restrictions may include an expiration time for the certificate, or restriction on transactions generated with a certificate. In an embodiment, at block 220, Alice's client generates a Bitcoin transaction using the public key derived from Alice's implicit certificate. In an embodiment, Bob's client may restrict the transaction in accordance with a policy or restriction encoded with Alice's certificate. In an embodiment, Bob's client uses one or more private keys that are derived from Bob's root key pair to sign the transaction. In an embodiment, the one or more private keys are associated with cryptocurrency funds sufficient to satisfy the payment request from Alice. In an embodiment, at block 222, Bob's client submits the transaction to a blockchain node in a blockchain network. In an embodiment, the blockchain network is the Bitcoin network or other cryptocurrency network. In an embodiment, Alice is able to confirm payment from Bob by downloading the transaction from the blockchain network.

Figure 3:
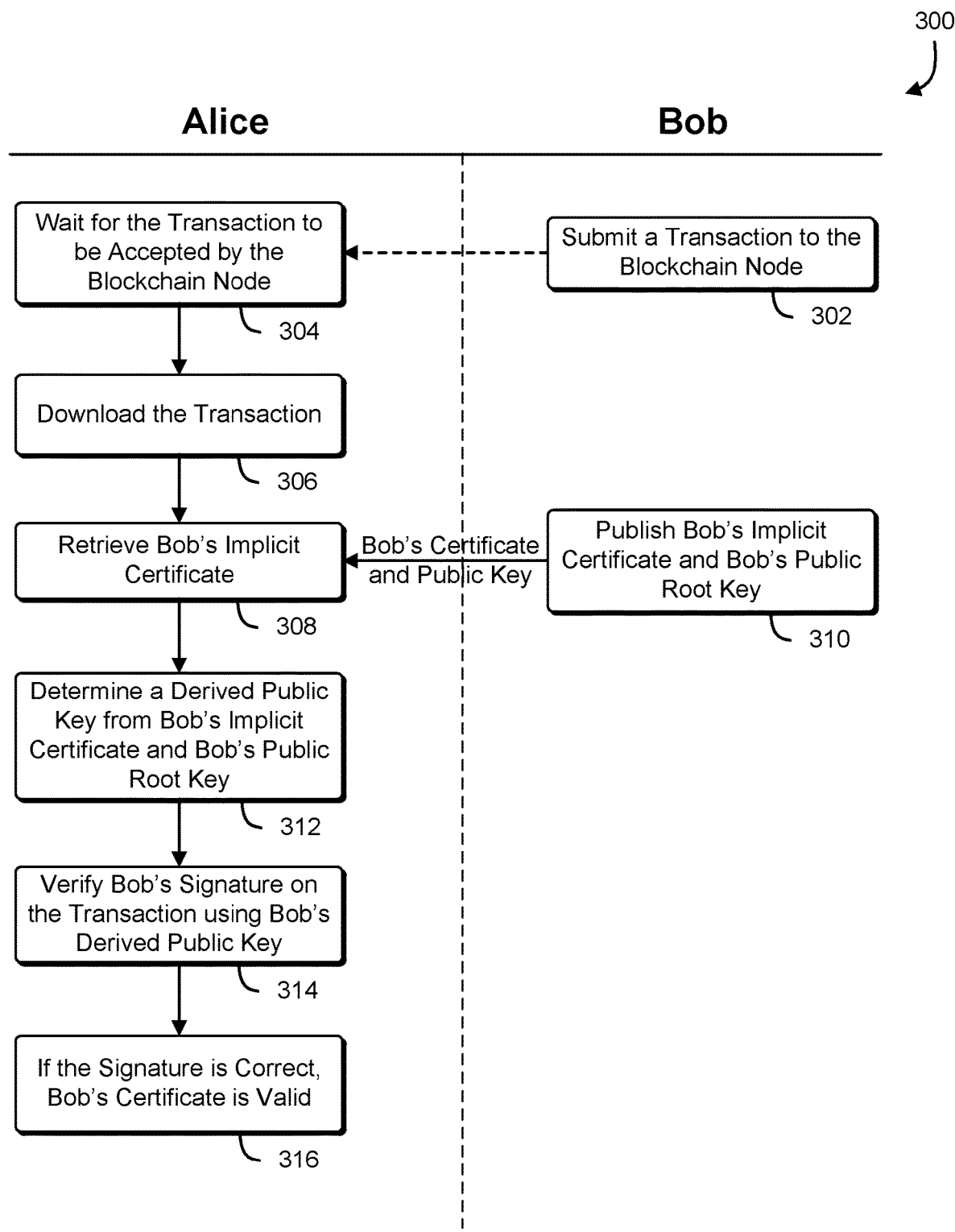
FIG. 3 shows a process a to verify a blockchain transaction using implicit certificates in accordance with one embodiment.

FIG. 3 shows an illustrative example of a process, in accordance with one embodiment. In an embodiment, a flowchart illustrates a process 300 that, as a result of being performed by Bitcoin clients operated by Alice and Bob, verifies a Bitcoin transaction using implicit certificates. In an embodiment, the process begins at block 302 with Bob's client submitting a transaction, such as a cryptocurrency payment transaction, to a blockchain node.

In an embodiment, at block 304, Alice's client downloads the current copy of the ledger from the blockchain network and waits for the transaction submitted by Bob's client to be accepted and verified by the network. In an embodiment, at block 306, Alice's client downloads the verified transaction from the blockchain network.

In an embodiment, at block 308, Alice's client retrieves Bob's implicit certificate that is associated with the transaction. In an embodiment, at block 310, Bob's client publishes Bob's implicit certificate and Bob's public root key so that transactions submitted by Bob can be verified by other parties. In an embodiment, at block 312, Alice's client uses Bob's implicit certificate and Bob's public root key to derive Bob's derived public key. In an embodiment, at block 314, using Bob's derived public key, Alice's client verifies Bob's signature on the transaction. In an embodiment, at block 316, if Bob's signature on the transaction is correct, Alice's client determines that the implicit certificate provided by Bob, as well as any optional information included in the certificate, is valid. In an embodiment, the optional information may be a policy to be enforced by Alice's client. In an embodiment, the policy may require Alice's client to wait until the transaction is validated by the blockchain network before a related action, such as shipping a product to Bob, is performed.

Figure 4:
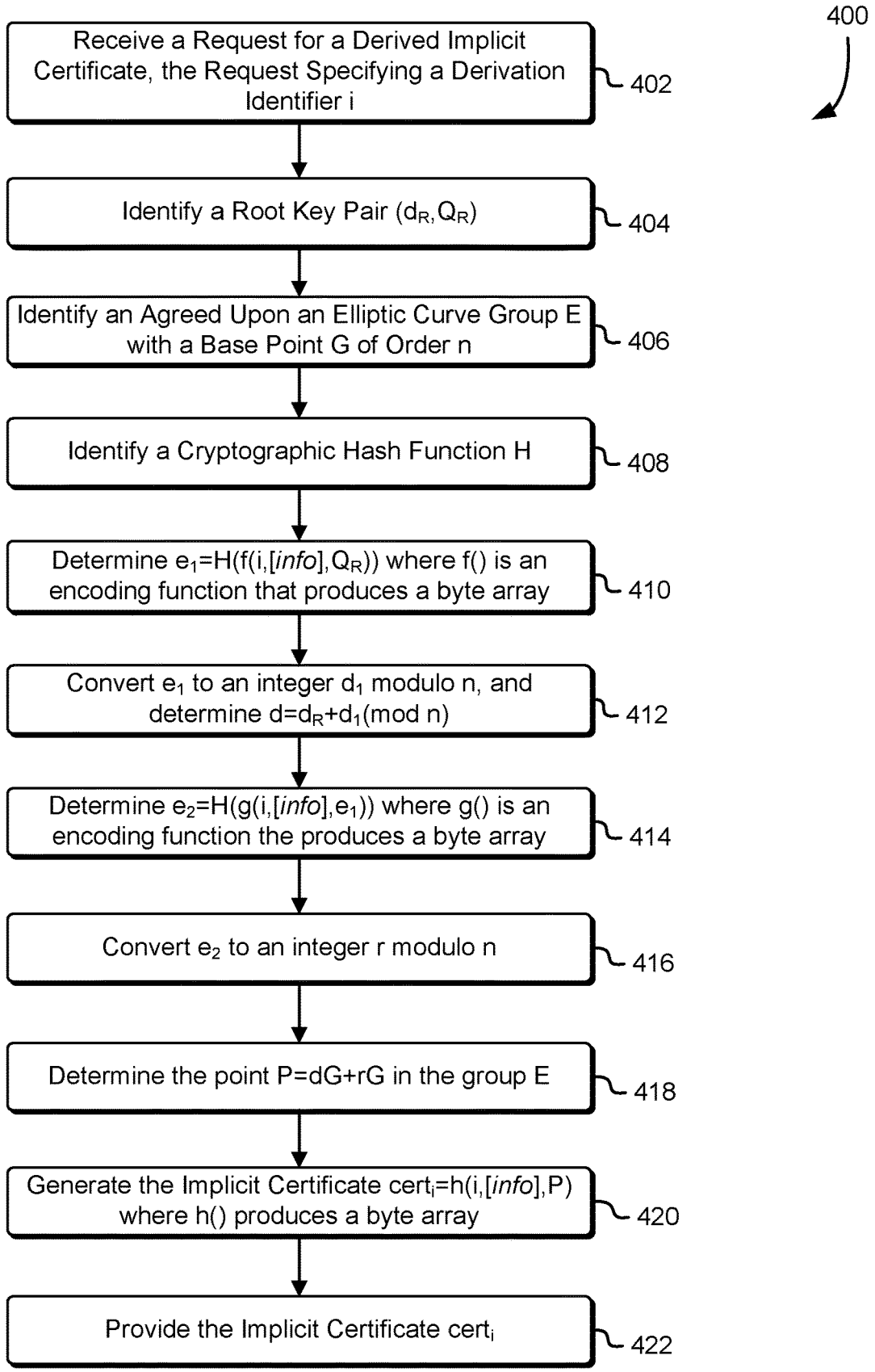
FIG. 4 shows a process to generate an implicit certificate from a root key pair in accordance with one embodiment.

FIG. 4 shows an illustrative example of a process, in accordance with one embodiment. In an embodiment, a flowchart illustrates a process 400 that, as a result of being performed by a blockchain client, generates an implicit certificate from a root key pair. In an embodiment, the blockchain client may be a cryptocurrency wallet such as a Bitcoin wallet. In an embodiment, at block 402, the blockchain client receives a request for a derived implicit certificate. In an embodiment, the request includes a derivation identifier (i) to be associated with the derived implicit certificate. In an embodiment, the derivation identifier is a random integer chosen by the blockchain client. In an embodiment, the derivation identifier is a member of a deterministic sequence of identifiers such as sequential integers, or integers derived with a cyclic redundancy code.

In an embodiment, the request includes optional information (info) to be encoded into the implicit certificate.

In an embodiment, at block 404, the blockchain client identifies a root key pair on which the derived implicit certificate is to be based. In an embodiment, the root key pair is a root key pair of a cryptocurrency wallet. In an embodiment, the root key pair includes a private key $d_R$ and a public key $Q_R$. In an embodiment, at block 406, the blockchain client identifies a set of elliptic curve parameters to be used to derive the implied certificate. In an embodiment, the elliptic curve parameters include an agreed-upon elliptic curve group E with a base point G of order n. In an embodiment, at block 408, the blockchain client identifies a cryptographic hash function H to be used to derive the implied certificate.

In an embodiment, at block 410, the blockchain client determines an intermediate value $e_1$ as follows, where f( ) is an encoding in function that produces byte array. In the present document, an encoding function may be any function that converts a data value into a byte array on a consistent basis. In an embodiment, the encoding function concatenates one or more values to produce a byte array. In another embodiment, the encoding function converts each value to a hexadecimal string, and concatenates the strings together using a character deliminator.

$$e_1=H(f(i,[info],Q_R))$$

In an embodiment, at block 412, the blockchain client converts the resulting value $e_1$ into the form of an integer $d_1$ modulo n, and computes a value d as follows.

$$d=d_R+d_1 \pmod{n}$$

In an embodiment, at block 414, the blockchain client determines a second intermediate value $e_2$, where g( ) is an encoding function that produces a byte array.

$$e_2=H(g(i,[info],e_1))$$

In an embodiment, at block 416, the second intermediate value $e_2$ is interpreted as an integer modulo n to produce a value r. In an embodiment, at block 418, the value r and the integer d are used to determine a point P on the elliptic curve group E.

$$P=dG+rG$$

In an embodiment, at block 420, the blockchain client is able to generate the implicit certificate using the derivation identifier, any optional information, and the point P as follows, where h( ) is a function that produces a byte array.

$$cert_i=h(i,[info],P)$$

In an embodiment, at block 422, the blockchain client is able to provide the implicit certificate $cert_i$ to another blockchain client, or in some embodiments, the blockchain client publishes the implicit certificate $cert_i$. In an embodiment, publishing the implicit certificate may be accomplished by making the implicit certificate available via a computer network to other blockchain clients or to an associated blockchain network. Additional material describing the ECQV are described in SEC4: Elliptic Curve Cryptography, Standards for Efficient Cryptography Group, Version 1.0, 2013, which is herein incorporated by reference.

Figure 5:
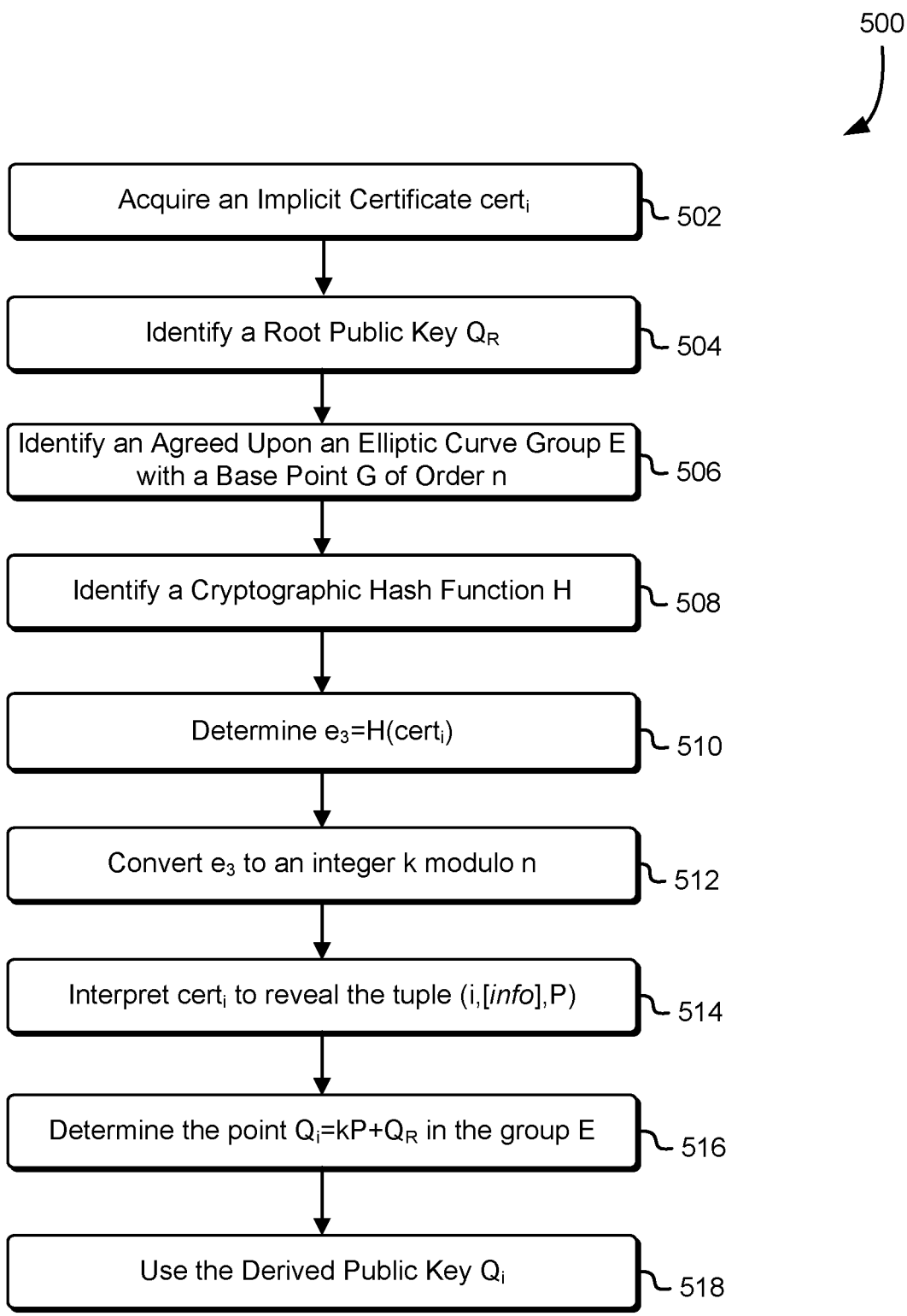
FIG. 5 shows a process to derive a public key from an implicit certificate in accordance with one embodiment.

FIG. 5 shows an illustrative example of a process, in accordance with one embodiment. In an embodiment, a flowchart illustrates a process 500 that, as a result of being performed by a blockchain client, generates a derived public key from an implicit certificate $cert_i$. In an embodiment, at block 502, the blockchain client acquires an implicit certificate from another entity such as another blockchain client.

In an embodiment, the implicit certificate may be acquired as part of a request for payment transaction. In an embodiment, at block 504, the blockchain client acquires a root public key $Q_R$ associated with the implicit certificate. In an embodiment, the root public key is provided with the implicit certificate. In an embodiment, at block 506, the blockchain client identifies a set of elliptic curve parameters to be used with the implicit certificate. In an embodiment, the elliptic curve parameters include an agreed-upon elliptic curve group E having a base point G of order n. In an embodiment, at block 508, the blockchain client identifies a cryptographic hash function H( ) to be used in deriving the public key from the implicit certificate $cert_i$.

In an embodiment, at block 510, the blockchain client computes an intermediate value $e_3$ as follows.

$$e_3=H(cert_i)$$

In an embodiment, at block 512, the intermediate value $e_3$ is interpreted as an integer modulo n to produce an integer k. In an embodiment, at block 514, the blockchain client interprets the certificate $cert_i$ to reveal its component pieces, the derivation identifier (i), any optional information encoded with the implicit certificate (info), and the point in the elliptic curve group (P).

$$cert_i \rightarrow tuple(i,[info],P)$$

In an embodiment, at block 516, the blockchain client computes the point in elliptic curve group E associated with the public key of the implicit certificate.

$$Q_i=kP+QR \text{ in the group } E$$

In an embodiment, at block 518, the blockchain client is able to use the derived public key to generate a blockchain transaction. In an embodiment, the blockchain client uses the derived public key to generate a payment transaction in a cryptocurrency. In an embodiment, the blockchain client uses the derived public key to verify the blockchain transaction submitted by the owner of the implicit certificate.

Figure 6:
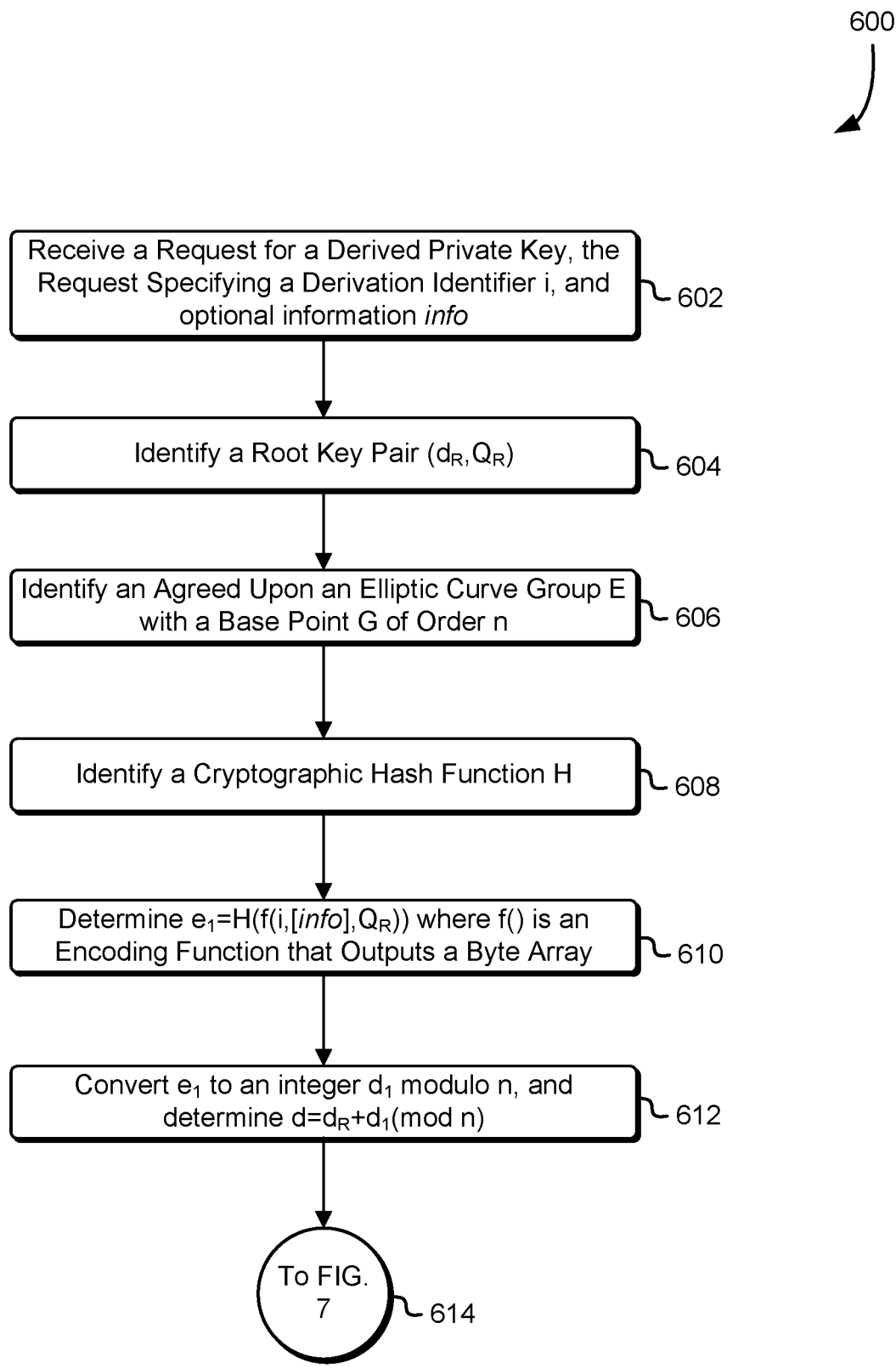
FIG. 6 shows a process to derive a private key from an implicit certificate in accordance with one embodiment.

FIG. 6 shows an illustrative example of a process, in accordance with one embodiment. In an embodiment, a flowchart illustrates a first portion of a process 600 that, as a result of being performed by a blockchain client, generates a derived private key from an implicit certificate. In an embodiment, at block 602, the blockchain client acquires a request for a derived private key, where the request specifies an implicit certificate cert; having a particular derivation identifier (i), and optional information (info) encoded into the implicit certificate.

In an embodiment, at block 604, the blockchain client identifies a root key pair ($d_R$, $Q_R$) for the owner of the implicit certificate $cert_i$, where $d_R$ is the root private key and $Q_R$ is the root public key. In an embodiment, at block 606, the blockchain client identifies an agreed-upon set of elliptic curve parameters. In an embodiment, the elliptic curve parameters specified in elliptic curve group E with a base point G of order n. In an embodiment, at block 608, the blockchain client identifies a cryptographic hash function H ( ) to be used when deriving the private key from the implicit certificate. In various embodiments, examples of cryptographic hash functions include SHA-512, MD5, RIPEND, BLAKE and BLAKE2.

In an embodiment, at block 610, blockchain client determines an intermediate value $e_1$, where f( ) is an encoding function that outputs a byte array.

$$e_1=H(f(i,[info],Q_R))$$

In an embodiment, at block 612, the intermediate value $e_1$ is interpreted as an integer modulo n to produce an integer $d_1$, and a key (d) is determined by computing:

$$d = d_R + d_1 \pmod{n}$$

Figure 7:
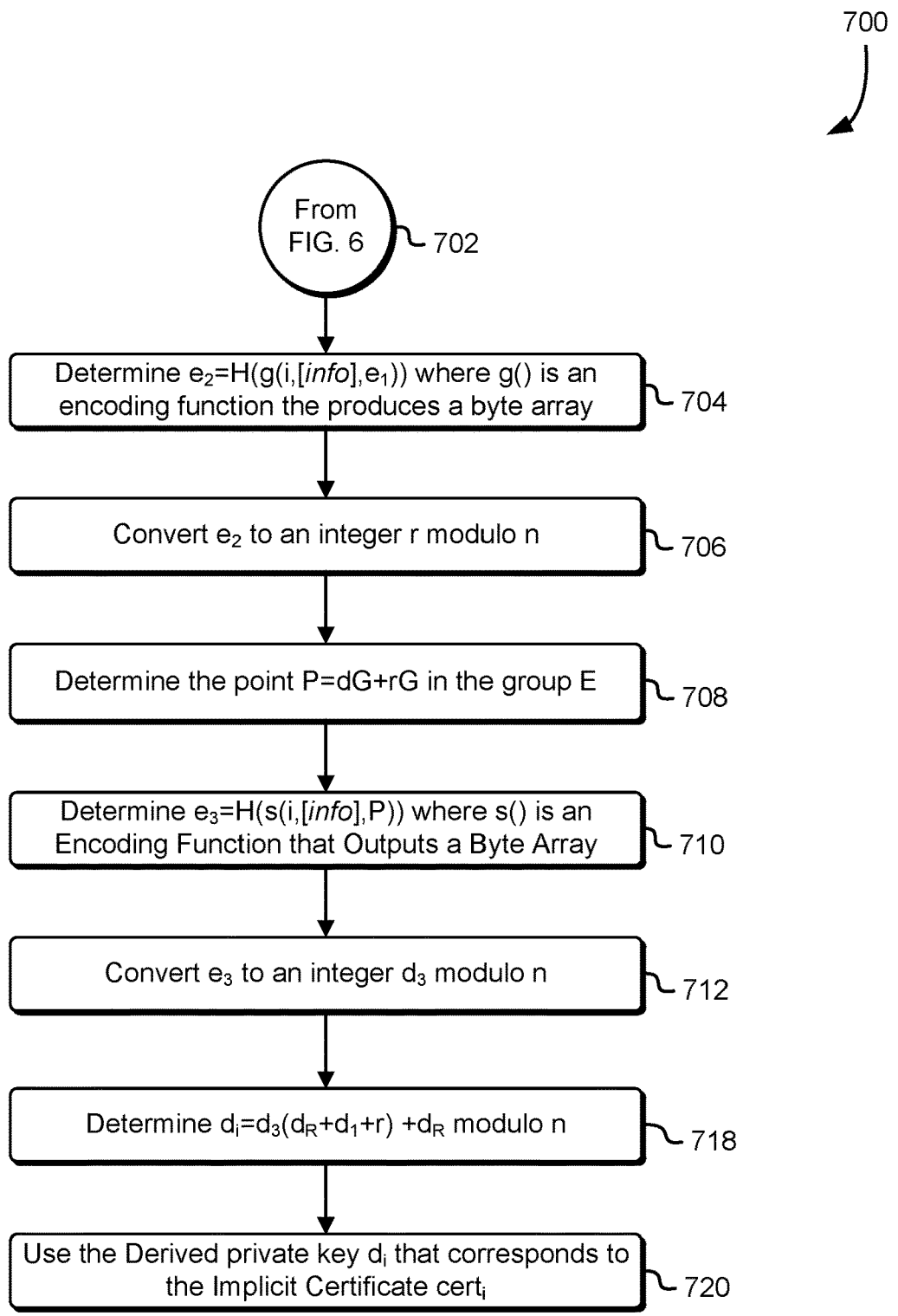
FIG. 7 shows a process to derive a private key from an implicit certificate in accordance with one embodiment.

At connection bubble 614, the process illustrated in FIG. 6 connects to a process illustrated in FIG. 7.

FIG. 7 shows an illustrative example of a process, in accordance with one embodiment. In an embodiment, a flowchart illustrates a second portion of a process 700 that, as a result of being performed by a blockchain client, generates a derived private key from an implicit certificate. The process shown in FIG. 6 continues that connection bubble 702. In an embodiment, at block 704, the blockchain client determines an intermediate value $e_2$ where g( ) is an encoding function that produces a byte array.

$$e_2 = H(g(i,[\text{info}],e_1))$$

In an embodiment, at block 706, the blockchain client interprets the intermediate value $e_2$ as an integer modulo n to produce and integer r. In an embodiment, at block 708, the blockchain client determines a point P using the values d and r as follows:

$$P = dG + rG \text{ in the group } E$$

In an embodiment, at block 710, the blockchain client determines an intermediate value $e_3$ where s( ) is an encoding function that outputs a byte array.

$$e_3 = H(s(i,[\text{info}],P))$$

In an embodiment, at block 712, the blockchain client converts the intermediate value $e_3$ to an integer modulo n to produce an integer value $d_3$. In an embodiment, at block 718, the blockchain client determines the derived private key ($d_i$) for the implicit certificate $\text{cert}_i$ as follows.

$$d_i = d_3(d_R + d_1 + r) + d_R \text{ modulo } n$$

In an embodiment, at block 720, the blockchain client uses the derived private key $d_i$ to generate a blockchain transaction. In an embodiment, the blockchain transaction is a payment transaction and the derived private key is used to sign the transaction record of the payment transaction.

Figure 8:
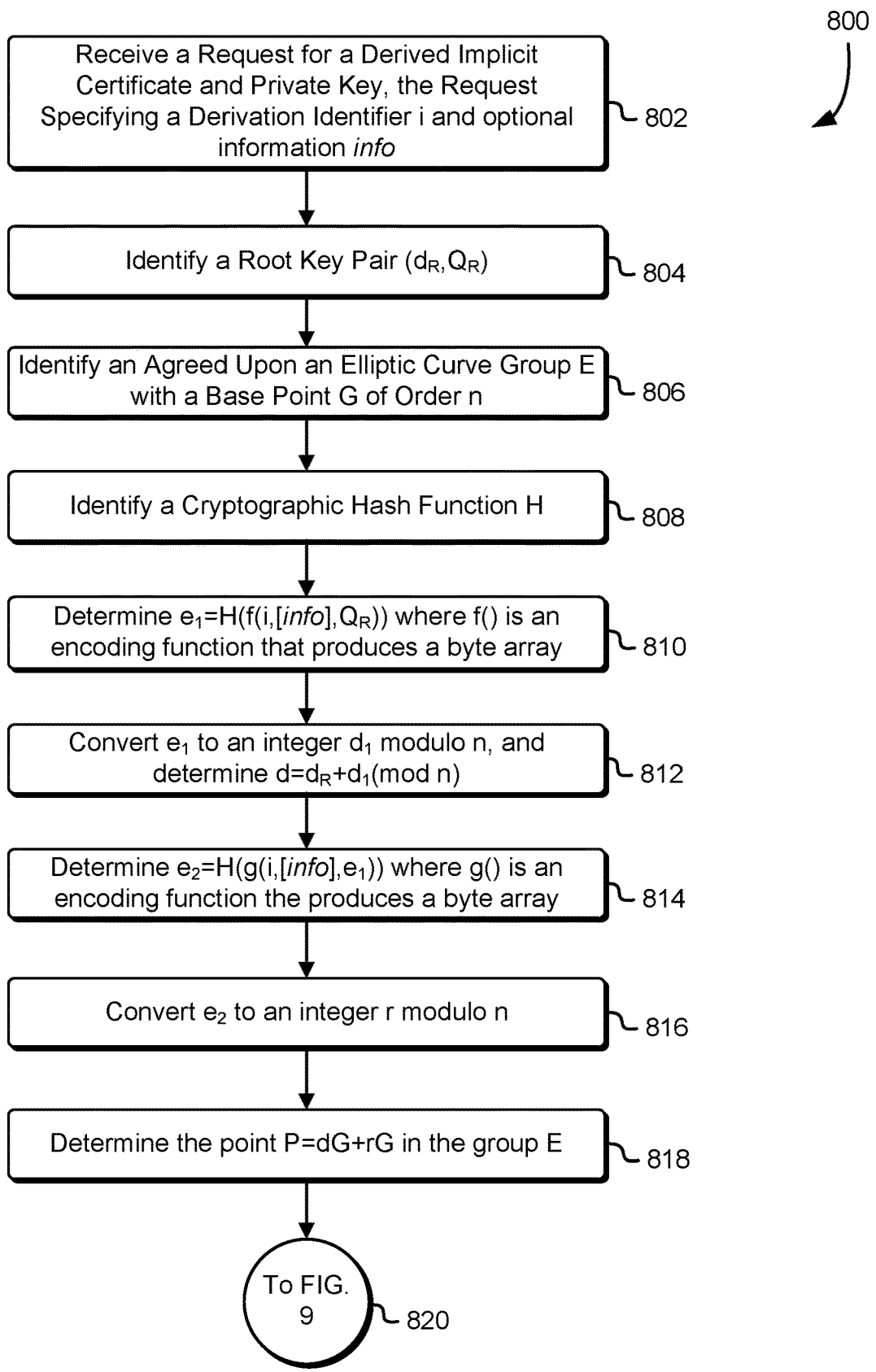
FIG. 8 shows a process to generate an implicit certificate and a derived private key from a root key pair in accordance with one embodiment.

FIG. 8 shows an illustrative example of a process, in accordance with one embodiment. In an embodiment, a flowchart illustrates a first portion of a process 800 that, as a result of being performed by a Bitcoin client, generates an implicit certificate and a derived private key from a root key pair. By combining the generation of the implicit certificate with the corresponding derived private key, the total amount of processing associated with the two operations can be reduced.

In an embodiment, at block 802, the blockchain client receives a request for a derived implicit certificate and a corresponding private key. In an embodiment, the request includes a derivation identifier (i) to be associated with the derived implicit certificate. In an embodiment, the derivation identifier is a random integer chosen by the blockchain client. In an embodiment, the derivation identifier is a member of a deterministic sequence of identifiers such as sequential integers or integers derived with a cyclic redundancy code. In an embodiment, the request includes optional information (info) to be encoded into the implicit certificate.

In an embodiment, at block 804, blockchain client identifies a root key pair on which the derived implicit certificate is to be based. In an embodiment, the root key pair is a root key pair of a cryptocurrency wallet. In an embodiment, the root key pair includes a private key $d_R$ and a public key $Q_R$. In an embodiment, at block 806, the blockchain client identifies a set of elliptic curve parameters to be used to derive the implied certificate. In an embodiment, the elliptic curve parameters include an agreed-upon elliptic curve group E with a base point G of order n. In an embodiment, at block 808, the blockchain client identifies a cryptographic hash function H to be used to derive the implied certificate.

In an embodiment, at block 810, the blockchain client determines an intermediate value $e_1$ as follows, where f( ) is an encoding in function that produces a byte array.

$$e_1 = H(f(i,[\text{info}],Q_R))$$

In an embodiment, at block 812, the blockchain client converts the resulting value $e_1$ into the form of an integer $d_1$ modulo n, and computes a value d as follows.

$$d = d_R + d_1 \pmod{n}$$

In an embodiment, at block 814, the blockchain client determines a second intermediate value $e_2$, where g( ) is an encoding function that produces a byte array.

$$e_2 = H(g(i,[\text{info}],e_1))$$

In an embodiment, at block 816, the second intermediate value $e_2$ is interpreted as an integer modulo n to produce a value r. In an embodiment, at block 818, the value r and the integer $d_1$ are used to determine a point P on the elliptic curve group E.

$$P = dG + rG$$

Figure 9:
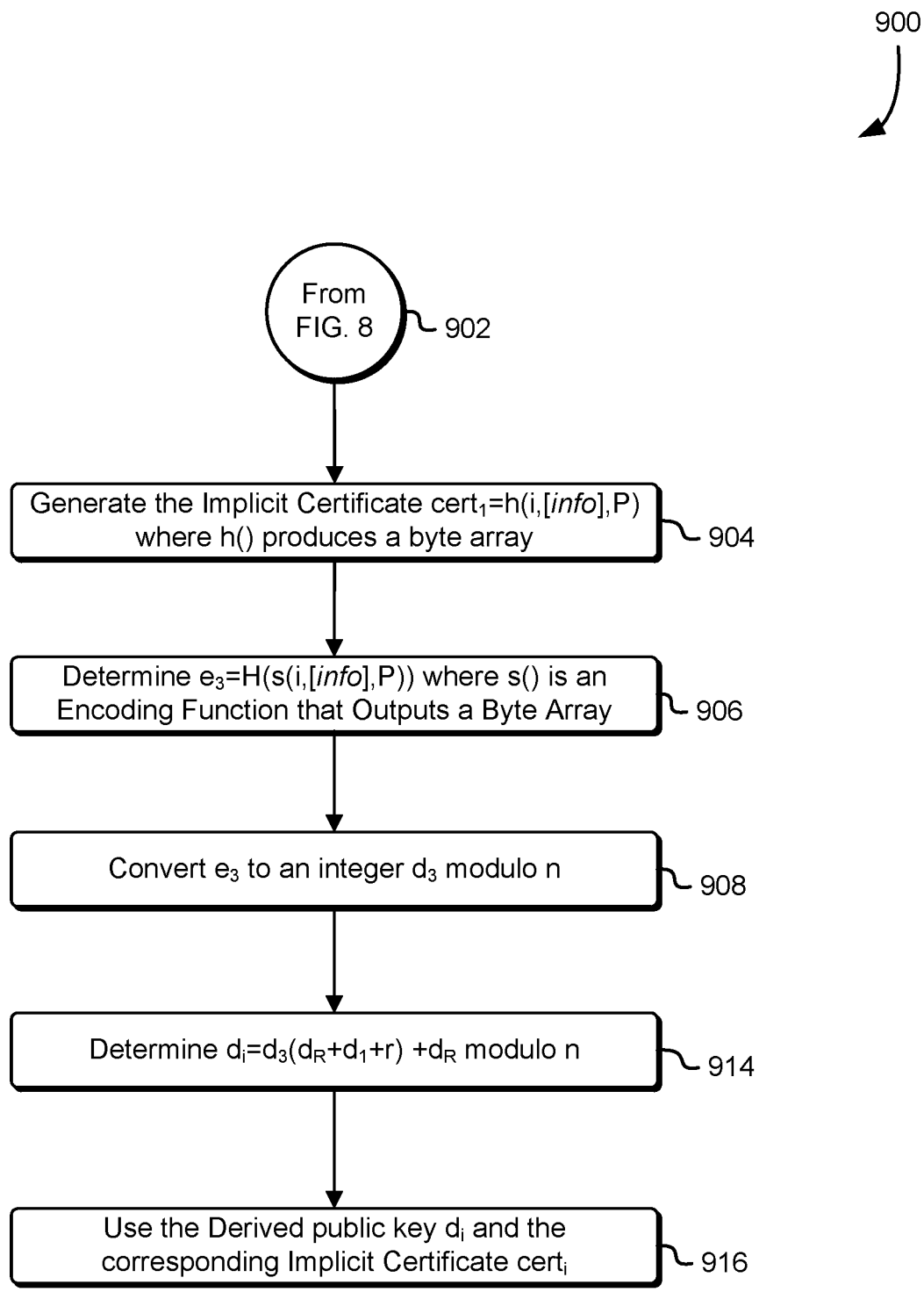
FIG. 9 shows a process to generate an implicit certificate and a derived private key from a root key pair.

At connection bubble 820, the process illustrated in FIG. 8 continues on FIG. 9.

FIG. 9 shows an illustrative example of a process, in accordance with one embodiment. In an embodiment, a flowchart illustrates a second portion of a process 900 that, as a result of being performed by a blockchain client, generates an implicit certificate and a derived private key from a root key pair. At connection bubble 902, the process shown in FIG. 8 continues. In an embodiment, at block 904, the blockchain client is able to generate the implicit certificate using the derivation identifier, any optional information, and the point P as follows, where h( ) is a function that produces a byte array.

$$\text{cert}_i = h(i,[\text{info}],P)$$

In an embodiment, at block 906, the blockchain client determines an intermediate value $e_3$ where s ( ) is an encoding function that outputs a byte array.

$$e_3 = H(s(i,[\text{info}],P))$$

In an embodiment, at block 908, the blockchain client converts the intermediate value $e_3$ to an integer modulo n to produce and integer value $d_3$. In an embodiment, at block 914, the blockchain client determines the derived private key ($d_i$) for the implicit certificate $\text{cert}_i$ as follows.

$$d_i = d_3(d_R + d_1 + r) + d_R \text{ modulo } n$$

In an embodiment, at block 916, the blockchain client is able to use the derived private key $d_i$ and the implicit certificate to generate a blockchain transaction. In an embodiment, the blockchain transaction is a payment transaction and the derived private key is used to sign the transaction record of the payment transaction. In an embodiment, the implicit certificate may be provided to another entity for use in generating an address to which to submit a cryptocurrency payment.

Figure 10:
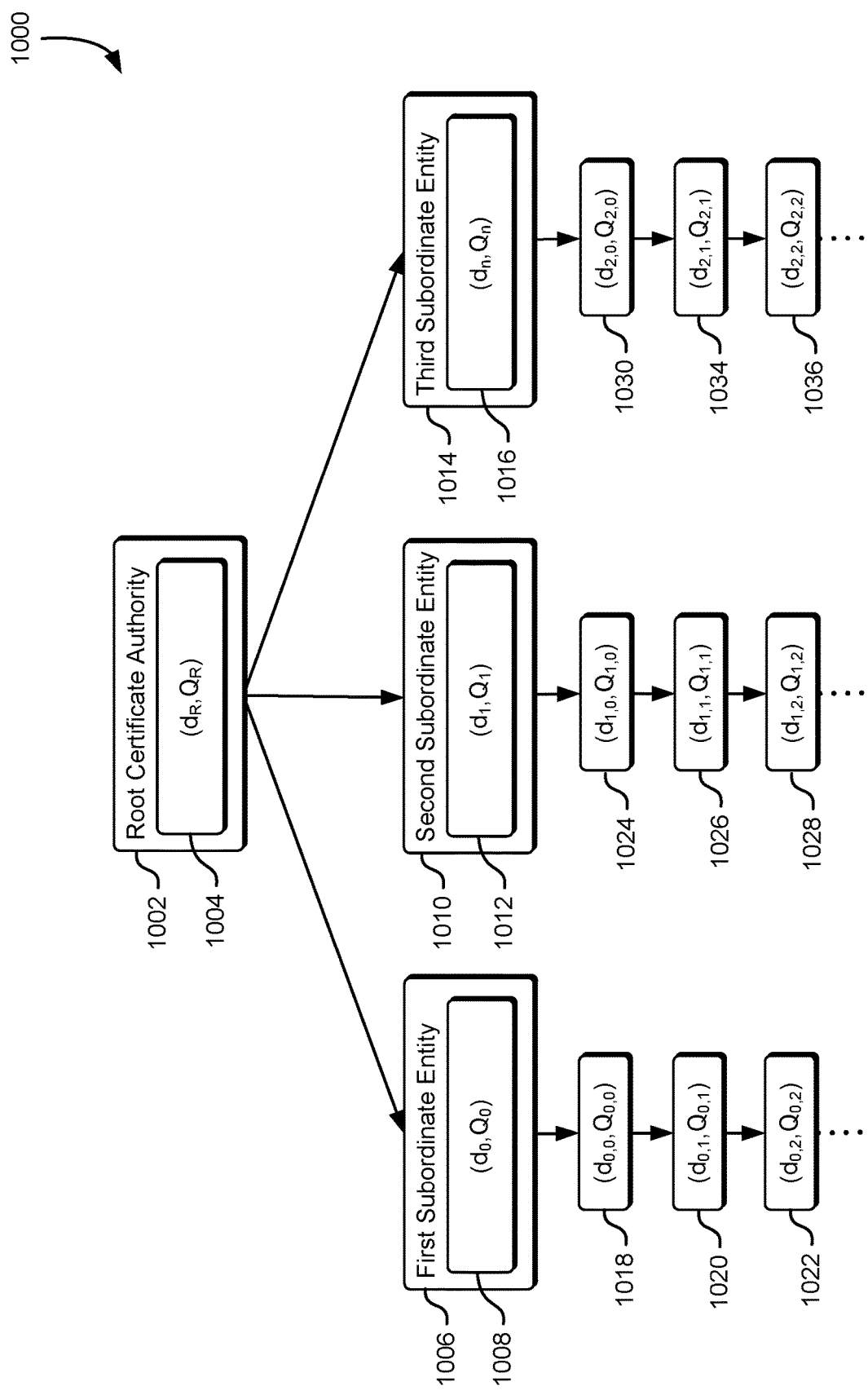
FIG. 10 shows a key tree, in accordance with one embodiment.

FIG. 10 shows an illustrative example of a key tree, in accordance with one embodiment. A diagram illustrates an embodiment of a tree 1000 of derived cryptographic keys suitable for use in a Bitcoin wallet. In an embodiment, a blockchain client may use a root key pair to derive a hierarchy of derived implicit certificates, and individual derived implicit certificates may be used to derive subordinate hierarchies of derived key pairs. In an embodiment, a hierarchy of derived certificates includes a root certificate 1004 associated with a root certificate authority 1002. In an embodiment, the root certificate 1004 includes a root private key $d_R$ and a root public key $Q_R$. In an embodiment, the root certificate authority derives a number of derived key pairs for subordinate entities. In an embodiment, the root certificate authority provides a first derived key pair 1008 to a first subordinate authority 1006, a second derived key pair 1012 to a second subordinate authority 1010, and a third derived key pair 1016 to a third subordinate authority 1014. In an embodiment, subordinate entities may include subsidiaries of the root certificate authority or trusted entities to which the root certificate authority wishes to delegate a subset of subordinate keys. In an embodiment, the derived key pairs are generated using unique derivation identifiers for each subordinate entity.

In an embodiment, each subordinate entity uses the derived key pair provided by the root certificate authority to derive additional key pairs. In an embodiment, additional derived key pairs may be used to derive additional implicit certificates. In an embodiment, the first subordinate authority 1006 derives a first subordinate derived key (0,0) 1018, a second subordinate derived key (0,1) 1020, and a third subordinate derived key (0,2) 1022. In an embodiment, the second subordinate authority 1010 derives a first subordinate derived key (1,0) 1024, a second subordinate derived key (1,1) 1026, and a third subordinate derived key (1,2) 1028. In an embodiment, the third subordinate authority 1014 derives a first subordinate derived key (2,0) 1030, a second subordinate derived key (2,1) 1034, and a third subordinate derived key (2,2) 1036.

In an embodiment, a derived key hierarchy such as the hierarchy illustrated in FIG. 10 may be used to implement a cryptocurrency wallet. In an embodiment, portions of the key space may be portioned off and provided to subordinate entities for payment processing. In an embodiment, the subordinate key spaces are provided in the form of an implicit digital certificate that includes encoded optional information. In an embodiment, the encoded optional information includes policies and restrictions on the key space granted to the subordinate entity.

In an embodiment, the derived key hierarchy may be used to divide funds available in a cryptocurrency wallet. In an embodiment, by delegating portions of the tree, the owner of the root key pair may delegate control over portions of the available funds to different entities.

Figure 11:
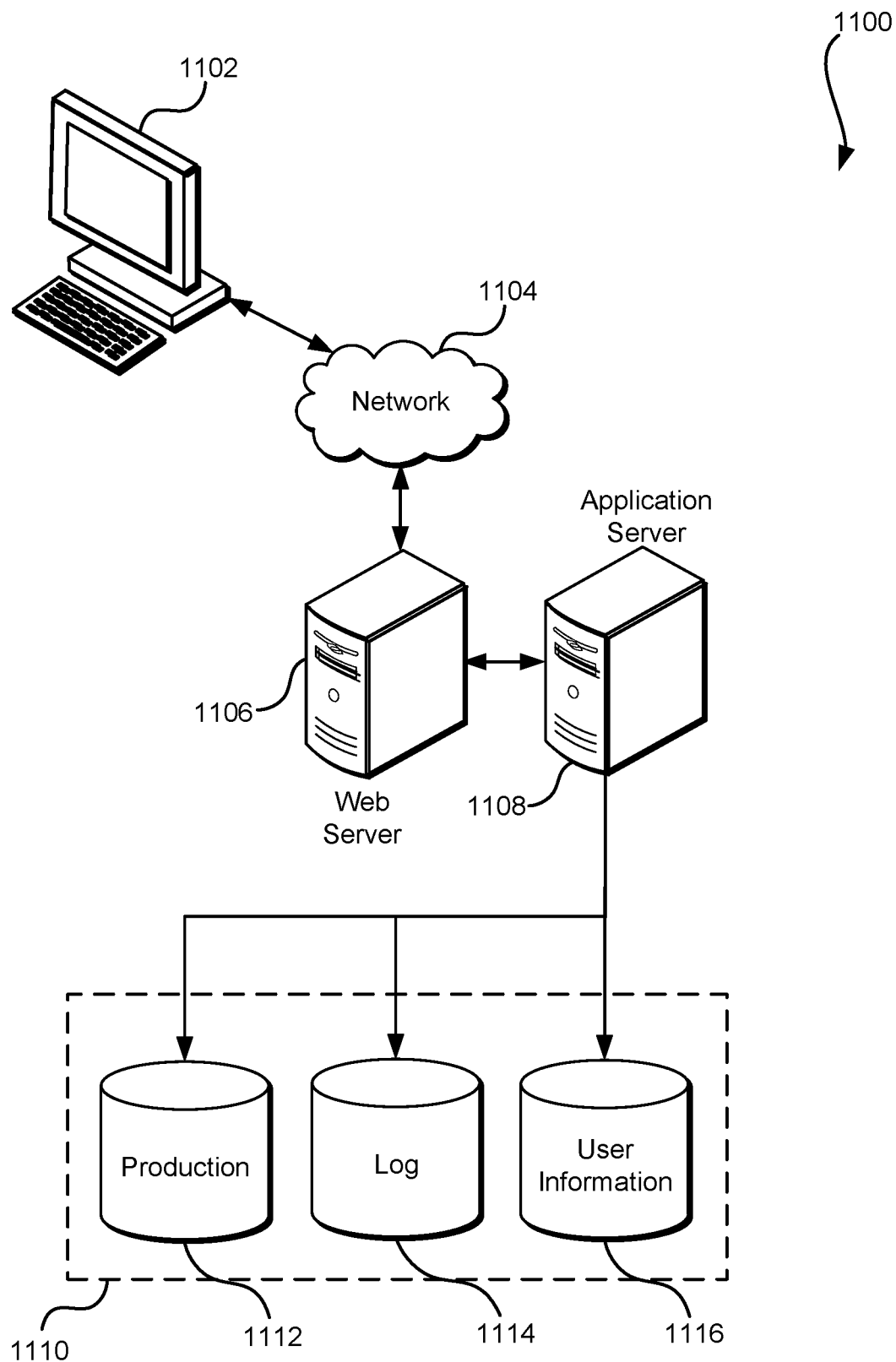
FIG. 11 shows a system in which various embodiments can be implemented.

FIG. 11 illustrates a system 1100 for implementing aspects in accordance with one embodiment. In an embodiment, a web-based system is used. The system includes an electronic client device 1102, which can include any appropriate device operable to send and/or receive requests, messages, or information over an appropriate network 1104 and, in an embodiment, convey information back to a user of the device. In an embodiment, client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network, and/or combination thereof. In an embodiment, components used for such a system can depend at least in part on the type of network and/or system selected. In an embodiment, communication over the network can be enabled by wired or wireless connections, and combinations thereof. In an embodiment, the network includes the Internet and/or publicly-addressable communications network, as the system includes a web server 1106 for receiving requests and serving content in response thereto. In an embodiment, an alternative device serving a similar purpose is used for other networks.

In an embodiment, the illustrative system includes at least one application server 1108 and a data store 1110. In an embodiment, there are several application servers, layers or other elements, processes or components, which are chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. In an embodiment, the application server can include any appropriate hardware, software and firmware that integrates with the data store as needed to execute aspects of one or more applications for the client device, handling some or all of the data access and business logic for an application. In an embodiment, the application server provides access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In an embodiment, content transferred to a client device is processed by the client device to provide the content in one or more forms including, but not limited to, forms that are perceptible to the user audibly, visually and/or through other senses. In an embodiment, the handling of requests and responses, and the delivery of content between the client device 1102 and the application server 1108, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In an embodiment, the data store 1110 includes several separate data tables, databases, data documents, dynamic data storage schemes and/or other data storage mechanisms, and media for storing data relating to a particular aspect of the present disclosure. In an embodiment, the data store illustrated includes mechanisms for storing production data 1112 and user information 1116, which can be used to serve content for the production side. In an embodiment, the data store is shown to include a mechanism for storing log data 1114, which can be used for reporting, analysis or other such purposes. In an embodiment, other aspects are stored in the data store, such as page image information and access rights information, which can be stored in any of the above listed mechanisms as appropriate or in additional mechanisms in the data store 1110. In an embodiment, the data store 1110 is operable, through logic associated therewith, to receive instructions from the application server 1108 and obtain, update or otherwise process data in response thereto. In an embodiment, the application server 1108 provides static, dynamic, or a combination of static and dynamic data in response to the received instructions. In an embodiment, dynamic data, such as data used in web logs (blogs), shopping applications, news services, and other such applications is generated by server-side structured languages as described herein or may be provided by a content management system ("CMS") operating on, or under the control of, the application server. In an embodiment, a user, through a device operated by the user, submits a search request for a certain type of item, and the data store accesses the user information to verify the identity of the user and can access the catalog detail information to obtain information about items of that type, and then the information is returned to the user. In an embodiment, the information is returned as a results listing on a web page that the user is able to view via a browser on the client device 1102. In an embodiment, information for a particular item of interest is viewed in a dedicated page or window of the browser. The present disclosure is not limited to the context of web pages, and may be applicable to processing requests in general where the requests are not requests for content.

In an embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. In an embodiment, such a system could have a fewer or a greater number of components than are illustrated in FIG. 11. Thus, the depiction of the system 1100 in FIG. 11 should be taken as being illustrative in nature and not limiting to the scope of the disclosure.

An embodiment can be implemented in a wide variety of systems, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. An embodiment can also include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual computer system, hypervisors and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In an embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In an embodiment, the protocol is a reliable connection-oriented protocol such as TCP. In an embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In an embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the server(s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In an embodiment, the server(s) include one or more database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In an embodiment, these reside in a variety of locations, such as on a storage medium local to (and/or resident in) one or more of the computers or remote from any or all of the computers across the network. In an embodiment, the information may reside in a storage area network ("SAN") familiar to those skilled in the art. In an embodiment, files for performing the functions attributed to the computers, servers or other network devices may be stored locally and/or remotely, as appropriate. In an embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device.

In an embodiment, a service may be implemented using a serverless computing architecture. In an embodiment, a serverless computing service is a service that allows users to submit requests for program execution to the service without being assigned a particular computing resource. In an embodiment, requests for execution on a serverless computing service are stateless from the standpoint of the service, and any program state is passed in with the request. In an embodiment, the host entity for the serverless computing service designates physical computing resources on demand, and may one or more computer systems as needed based on transient demand. In an embodiment, serverless computing services improve the scalability of the system by allowing requests to be fulfilled using a variety of physical processing resources under the control of the serverless computing service.

As discussed, numerous variations utilize symmetric and/or asymmetric cryptographic primitives. Symmetric key algorithms may include various schemes for performing cryptographic operations on data including block ciphers, stream ciphers, and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In an embodiment, the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.), and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold), and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method, comprising:
    receiving an implicit digital certificate comprising at least a set of parameters, the set of parameters comprising at least a point on an elliptic curve group
    deriving a public key based at least in part on the point on the elliptic curve group associated, the public key derived using a function that accepts at least the point on the elliptic curve group;
    receiving a private key that corresponds to the public key derived from the implicit digital certificate;
    generating a key identifier;
    deriving an additional implicit digital certificate from the private key, the public key, and the key identifier; and
    generating a blockchain transaction based at least in part on the public key; and
    provide the additional implicit digital certificate to enable an additional public key to be recovered and used for a destination address for the blockchain transaction.

2. The computer-implemented method of claim 1, further comprising:
    extracting, from the set of parameters, an identifier associated with the public key, and the point on the elliptic curve group;
    determining a cryptographic hash of the implicit digital certificate; and
    determining the public key based at least in part on the identifier, a sum of a first public key associated with the implicit digital certificate and a product of the cryptographic hash, and the point of the elliptic curve group.

3. The computer-implemented method of claim 1, further comprising generating another blockchain transaction, the other blockchain transaction based at least in part on the blockchain transaction and an additional private key derived from the additional implicit digital certificate.

4. The computer-implemented method of claim 1, wherein the implicit digital certificate encodes a policy that limits use of a cryptographic key associated with the implicit digital certificate.

5. The computer-implemented method of claim 1, wherein the blockchain transaction is a cryptocurrency payment transaction.

6. A system, comprising:
    memory to store computer-executable instructions that, as a result of being executed by one or more processors, cause the system to:
        receive an implicit digital certificate comprising at least a set of parameters, the set of parameters comprising at least a point on an elliptic curve group
        derive a public key based at least in part on the point on the elliptic curve group associated, the public key derived using a function that accepts at least the point on the elliptic curve group;
        receive a private key that corresponds to the public key derived from the implicit digital certificate;
        generate a key identifier;
        derive an additional implicit digital certificate from the private key, the public key, and the key identifier; and generate a blockchain transaction based at least in part on the public key; and provide the additional implicit digital certificate to enable an additional public key to be recovered and used for a destination address for the blockchain transaction.

7. The system of claim 6, wherein the computer-executable instructions, as a result of being executed by the one or more processors, further cause the system to:
  extract, from the set of parameters, an identifier associated with the public key, and the point on the elliptic curve group;
  determine a cryptographic hash of the implicit digital certificate; and
  determine the public key based at least in part on the identifier, a sum of a first public key associated with the implicit digital certificate and a product of the cryptographic hash, and the point of the elliptic curve group.

8. The system of claim 6, wherein the computer-executable instructions, as a result of being executed by the one or more processors, further cause the system to generate another blockchain transaction, the other blockchain transaction based at least in part on the blockchain transaction and an additional private key derived from the additional implicit digital certificate.

9. The system of claim 6, wherein the implicit digital certificate encodes a policy that limits use of a cryptographic key associated with the implicit digital certificate.

10. The system of claim 6, wherein the blockchain transaction is a cryptocurrency payment transaction.

11. A non-transitory computer-readable storage medium having stored thereon executable instructions that, as a result of being executed by one or more processors of a computer system, cause the computer system to at least:
  receive an implicit digital certificate comprising at least a set of parameters, the set of parameters comprising at least a point on an elliptic curve group
  derive a public key based at least in part on the point on the elliptic curve group associated, the public key derived using a function that accepts at least the point on the elliptic curve group;
  receive a private key that corresponds to the public key derived from the implicit digital certificate;
  generate a key identifier;
  derive an additional implicit digital certificate from the private key, the public key, and the key identifier; and
  generate a blockchain transaction based at least in part on the public key; and
  provide the additional implicit digital certificate to enable an additional public key to be recovered and used for a destination address for the blockchain transaction.

12. The non-transitory computer-readable storage medium of claim 11, wherein the instructions further comprise instructions that, as a result of being executed by the one or more processors, cause the computer system to:
  extract, from the set of parameters, an identifier associated with the public key, and the point on the elliptic curve group;
  determine a cryptographic hash of the implicit digital certificate; and
  determine the public key based at least in part on the identifier, a sum of a first public key associated with the implicit digital certificate and a product of the cryptographic hash, and the point of the elliptic curve group.

13. The non-transitory computer-readable storage medium of claim 11, wherein the instructions that cause the computer system further include instructions that cause the computer system to generate another blockchain transaction, the other blockchain transaction based at least in part on the blockchain transaction and an additional private key derived from the additional implicit digital certificate.

14. The non-transitory computer-readable storage medium of claim 11, wherein the implicit digital certificate encodes a policy that limits use of a cryptographic key associated with the implicit digital certificate.

15. The non-transitory computer-readable storage medium of claim 11, wherein the blockchain transaction is a cryptocurrency payment transaction.

\* \* \* \* \*